(12) United States Patent
Gupta et al.

(10) Patent No.: US 12,278,754 B2
(45) Date of Patent: *Apr. 15, 2025

(54) OPTIMIZED PROTECTED SEGMENT-LIST DETERMINATION FOR WEIGHTED SRLG TI-LFA PROTECTION

(71) Applicant: Cisco Technology, Inc., San Jose, CA (US)

(72) Inventors: Manish Gupta, Karnataka (IN); Peter Psenak, Bratislava (SK)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/516,571

(22) Filed: Nov. 21, 2023

(65) Prior Publication Data
US 2024/0089190 A1    Mar. 14, 2024

Related U.S. Application Data

(63) Continuation of application No. 17/384,130, filed on Jul. 23, 2021, now Pat. No. 11,838,201.

(51) Int. Cl.
*H04L 45/12* (2022.01)
(52) U.S. Cl.
CPC .................................... *H04L 45/12* (2013.01)
(58) Field of Classification Search
CPC ....................................................... H04L 45/12
See application file for complete search history.

(56) References Cited

U.S. PATENT DOCUMENTS

| | | | |
|---|---|---|---|
| 8,374,092 B2 | 2/2013 | Previdi et al. | |
| 9,270,426 B1* | 2/2016 | Atlas | H04L 45/48 |
| 9,485,135 B1* | 11/2016 | Sarkar | H04L 41/0654 |
| 9,571,387 B1* | 2/2017 | Atlas | H04L 12/1877 |
| 10,003,522 B2 | 6/2018 | Ahuja et al. | |
| 10,298,488 B1 | 5/2019 | Wood et al. | |
| 10,462,045 B1* | 10/2019 | Francois | H04L 45/28 |
| 2003/0172362 A1 | 9/2003 | Mack-Crane et al. | |
| 2005/0073958 A1 | 4/2005 | Atlas et al. | |
| 2009/0154346 A1* | 6/2009 | Sun | H04L 12/1863 370/228 |

(Continued)

FOREIGN PATENT DOCUMENTS

WO    2017101981 A1    6/2017

*Primary Examiner* — Atique Ahmed
(74) *Attorney, Agent, or Firm* — Polsinelli P.C.

(57) ABSTRACT

A method includes generating a first shortest path tree for traffic routing in a network, the first shortest path tree identifying a corresponding shortest path from the network node to other nodes in the network and generating a second shortest path tree for traffic routing after removing an element from the network. The second shortest path tree identifies a corresponding shortest path from the network node to the other nodes in the network with the element removed. A third shortest path tree is generated, which is a weighted version of the second shortest path tree with a weight value added to any node or link in the network sharing a SRLG value with the element removed from the network. Network traffic is enforced based on a comparison of the third shortest path tree with at least one of the first shortest path tree and the second shortest path tree.

20 Claims, 6 Drawing Sheets

(56) References Cited

U.S. PATENT DOCUMENTS

| | | | |
|---|---|---|---|
| 2011/0141877 A1* | 6/2011 | Xu | H04L 41/0654 |
| | | | 370/216 |
| 2012/0182865 A1 | 7/2012 | Andersen et al. | |
| 2012/0195229 A1 | 8/2012 | Chen | |
| 2013/0336109 A1 | 12/2013 | Previdi et al. | |
| 2015/0016242 A1* | 1/2015 | Ernstrom | H04L 45/122 |
| | | | 370/218 |
| 2016/0191391 A1* | 6/2016 | Wood | H04L 47/125 |
| | | | 370/235 |
| 2016/0218961 A1 | 7/2016 | Lindem, III et al. | |
| 2016/0226701 A1* | 8/2016 | Luo | H04L 41/12 |
| 2017/0063666 A1* | 3/2017 | Ahuja | H04L 45/121 |
| 2019/0238450 A1* | 8/2019 | Michael | H04L 47/122 |
| 2021/0258243 A1 | 8/2021 | Narasimhan et al. | |
| 2022/0103458 A1 | 3/2022 | Margaria et al. | |

\* cited by examiner

OPTIMIZED PROTECTED SEGMENT-LIST DETERMINATION FOR WEIGHTED SRLG TI-LFA PROTECTION

CROSS-REFERENCE TO RELATED APPLICATION

This application is a Continuation of U.S. Non-Provisional patent application Ser. No. 17/384,130 filed on Jul. 23, 2021, entitled "OPTIMIZED PROTECTED SEGMENT-LIST DETERMINATION FOR WEIGHTED SRLG TI-LFA PROTECTION" the entire contents of which are hereby expressly incorporated by reference in their entirety.

DESCRIPTION OF THE RELATED TECHNOLOGY

Topology-Independent Loop-Free Alternate (TI-LFA) path selection uses segment routing to provide link, node, and Shared Risk Link Groups (SRLG) protection in network topologies where other fast reroute techniques cannot provide protection. Classic Loop-Free Alternate (LFA) is topology dependent, and therefore cannot protect all destinations in all networks. A limitation of LFA is that, even if one or more LFAs exist, the optimal LFA may not always be provided. Remote LFA (RLFA) extends the coverage to a majority of the destinations, but it also does not always provide the most desired repair path. RLFA also adds more operational complexity by requiring a targeted Label Distribution Protocol (LDP) session to the RLFAs to protect LDP traffic.

Existing LFA implementations in Interior Gateway Protocol (IGP) networks support SRLG protection. The existing SRLG protection only takes into consideration SRLGs of the directly connected links (local links), providing what may be referred to as "Local SRLG protection". This means that protected interface and the backup path interface are required to not share any SRLG values.

Local SRLG protection suffers from several deficiencies. Since only the local links are considered in existing SRLG protections, if one or more links not connected to a given router that is calculating a back-up path, share the same SRLG as the protected link on the calculating router, a backup path may actually cross the link that shares the same SRLG as the protected link. In such case, the backup path may divert the traffic to a path over a link that failed as well, resulting in traffic being dropped during the protecting time.

BRIEF DESCRIPTION OF THE DRAWINGS

The embodiments herein may be better understood by referring to the following description in conjunction with the accompanying drawings in which like reference numerals indicate identically or functionally similar elements, of which.

DETAILED DESCRIPTION

Figure 1:
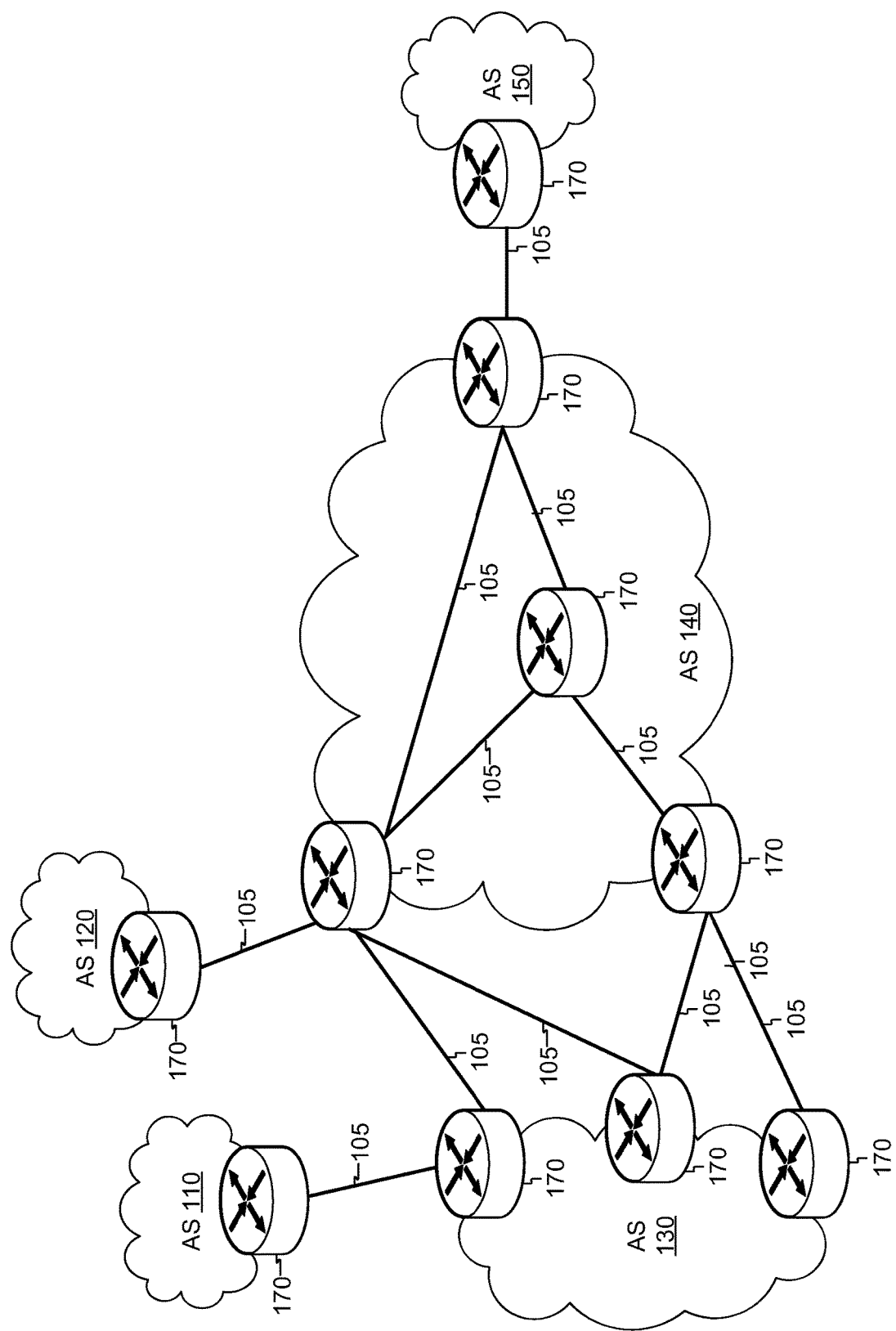
FIG. 1 illustrates an example communication network including one or more autonomous systems (ASes), according to some aspects of the present disclosure.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Disclosed are systems, apparatuses, methods, and computer-readable media directed to enforcing path selection when performing segment routing of network traffic, where the path selection is based on remote weighted Shared Risk Ling Group (SRLG). As will be described below, a number of shortest path trees may be determined for a given network topology. More specifically, a first shortest path tree may be determined for a given network topology according to normal Interior Gateway Protocol (IGP) metrics identifying a shortest path from each node in the network to other nodes in the network. A second shortest path tree may be determined where a network element (e.g., a network node such as a router or a link connecting two network nodes) is removed to be protected. A third shortest path tree is determined, which may be the same as the second shortest path tree except that any network link sharing the same SRLG value with the network element protected when determining the second shortest path tree, is penalized. The shortest path trees may then be compared and any one of a number of traffic enforcement approaches may be applied/implemented for segment routing of the network traffic based on the comparison.

In one aspect, a method includes generating, at a network node, a first shortest path tree for traffic routing in a network, the first shortest path tree identifying a corresponding shortest path from the network node to other nodes in the network; generating, at the network node, a second shortest path tree for traffic routing after removing an element from the network, wherein the second shortest path tree identifies a corresponding shortest path from the network node to the other nodes in the network with the element removed; generating, at the network node, a third shortest path tree, wherein the third shortest path tree is a weighted version of the second shortest path tree with a weight value added to any node or link in the network sharing a shared risk link group value with the element removed from the network when generating the second shortest path tree; and performing, at the network node, traffic enforcement based on a comparison of the third shortest path tree with at least one of the first shortest path tree and the second shortest path tree.

In another aspect, the element removed from the network is one of a node or a link connecting two nodes in the network.

In another aspect, wherein nodes or links in the shared risk link group share at least one common resource.

In another aspect, the traffic enforcement includes determining, for each node of the network, whether a corresponding at least one parent node in the third shortest path tree is the same as a corresponding at least one parent node in the first shortest path tree; and performing no traffic enforcement on the node if the corresponding at least one parent node in the first shortest path tree and the third shortest path tree are the same.

In another aspect, the method further includes setting a flag on a given node when corresponding at least one parent node of the given node in the first shortest path tree and corresponding at least one parent node of the given node in the third shortest path tree are not the same, corresponding at least one parent node of the given node in the second shortest path tree and the corresponding parent node in the third shortest path tree are the same, and traffic is not enforced based on the second shortest path tree.

In another aspect, the traffic enforcement includes determining, for a given node of the network, that a corresponding at least one parent node in the third shortest path tree is not the same as a corresponding at least one parent node in the first shortest path tree; determining, for the given node of the network, that the at least one corresponding parent node in the third shortest path tree is the same as a corresponding at least one parent node in the second shortest path tree; and performing the traffic enforcement as determined for the regular TI-LFA path selection.

In another aspect, the traffic enforcement includes determining, for a given node of the network, that a corresponding at least one parent node in the third shortest path tree is not the same as a corresponding at least one parent node in the first shortest path tree; determining, for the given node of the network, that the corresponding at least one parent node in the third shortest path tree is not the same as a corresponding at least one parent node in the second shortest path tree; and performing the traffic enforcement by including a segment identifier of the corresponding at least one parent of the given node in the third shortest path tree, in a packet stack.

In one aspect, a network node includes one or more memories having computer-readable instructions stored therein and one or more processors. The one or more processors are configured to execute the computer-readable instructions to generate a first shortest path tree for traffic routing in a network, the first shortest path tree identifying a corresponding shortest path from the network node to other nodes in the network; generate a second shortest path tree for traffic routing after removing an element from the network, wherein the second shortest path tree identifies a corresponding shortest path from the network node to the other nodes in the network with the element removed; generate a third shortest path tree, wherein the third shortest path tree is a weighted version of the second shortest path tree with a weight value added to any node or link in the network sharing a shared risk link group value with the element removed from the network when generating the second shortest path tree; and perform traffic enforcement based on a comparison of the third shortest path tree with at least one of the first shortest path tree and the second shortest path tree.

In one aspect, one or more non-transitory computer-readable media include computer-readable instructions, which when executed by one or more processors at a network node, cause the network node to generate a first shortest path tree for traffic routing in a network, the first shortest path tree identifying a corresponding shortest path from the network node to other nodes in the network; generate a second shortest path tree for traffic routing after removing an element from the network, wherein the second shortest path tree identifies a corresponding shortest path from the network node to the other nodes in the network with the element removed; generate a third shortest path tree, wherein the third shortest path tree is a weighted version of the second shortest path tree with a weight value added to any node or link in the network sharing a shared risk link group value with the element removed from the network when generating the second shortest path tree; and perform traffic enforcement based on a comparison of the third shortest path tree with at least one of the first shortest path tree and the second shortest path tree.

Example Embodiments

A network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other.

Since management of interconnected networks can prove burdensome, smaller groups of networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

FIG. 1 illustrates an example communication network including one or more autonomous systems (ASes), according to some aspects of the present disclosure. The example network 100 of FIG. 1 includes nodes/devices interconnected by various methods of communication. For instance, the example links 105 may be any suitable combination of wired links and shared media (e.g., wireless links, Internet Exchange Points, etc.) where certain nodes 170, such as, e.g., switches, routers, computers, etc., may be in communication with other nodes 170, e.g., based on distance, signal strength, current operational status, location, etc. Those skilled in the art will understand that any number of nodes, devices, links, etc. may be used in the network, and that the view shown herein is for simplicity.

Network traffic (e.g., data and/or messages sent between the devices/nodes) may be exchanged among the nodes/devices of the network 100 using predefined network communication protocols such as certain known wired protocols, as well as wireless protocols or other shared-media protocols where appropriate.

The network 100 includes a set of AS such as 110, AS 120, AS 130, AS 140 and AS 150. The network 100 may be positioned in any suitable network environment or communications architecture that operates to manage or otherwise direct information using any appropriate routing protocol or data management standard. For example, the network 100 may be provided in conjunction with a BGP.

As noted above, an AS may be a collection of connected Internet Protocol (IP) routing devices under the control of one or more network operators that presents a common, defined routing policy to a network (e.g., the Internet). Usually, an AS comprises network devices, e.g., nodes/devices 170, that are established on the edge of the system, and that serve as the system's ingress and egress points for network traffic. Moreover, the devices 170 may be considered edge devices, border routers, or core devices within the respective AS. These network elements typically, but not always, are routers or any other element of network infrastructure suitable for switching or forwarding data packets according to a routing protocol or switching protocol. For the purposes of the present disclosure, the network elements located within an AS may alternatively be referred to as "forwarding devices" or "intermediate devices." Moreover, for illustration purposes, the AS 110, AS 120, AS 130, AS 140 and AS 150 are shown with a limited number of devices 170. In an actual implementation, however, an AS normally comprises numerous routers, switches, and other elements.

Each AS 110, AS 120, AS 130, AS 140 and AS 150 may be associated with an Internet Service provider (ISP). Even though there may be multiple ASes supported by a single ISP, the Internet only sees the routing policy of the ISP. That ISP must have an officially registered Autonomous System Number (ASN). As such, a unique ASN is allocated to each AS for use in BGP routing. ASNs are important primarily because they uniquely identify each network on the Internet.

To facilitate the routing of network traffic through the ASes, or more specifically, the devices 170 within the ASes, the devices may exchange routing information to various network destinations. As described above, BGP is conventionally used to exchange routing and reachability information among network elements, e.g., devices 170, within a single AS or between different ASes. One particular example of BGP is BGPv4, as defined in Request for Comments (RFC) 1771 of the Internet Engineering Task Force (IETF). Various embodiments may implement other versions of BGP, however, and the use of BGPv4 is not required. The BGP logic of a router is used by the data collectors to collect BGP AS path information, e.g., the "AS PATH" attribute, as described further below, from BGP tables of border routers of an AS, to construct paths to prefixes.

To exchange BGP routing information, two BGP hosts (devices 170), or peers, first establish a transport protocol connection with one another. Initially, the BGP peers exchange messages to open a BGP session, and, after the BGP session is open, the BGP peers exchange their entire routing information. Thereafter, in some examples, only updates or changes to the routing information, e.g., the "BGP UPDATE" attribute, are exchanged, or advertised, between the BGP peers. The exchanged routing information is maintained by the BGP peers during the existence of the BGP session.

The BGP routing information may include the complete route to each network destination, e.g., "destination device," that is reachable from a BGP host. A route, or path, comprises an address destination, which is usually represented by an address prefix (also referred to as prefix), and information that describe the path to the address destination. The address prefix may be expressed as a combination of a network address and a mask that indicates how many bits of the address are used to identify the network portion of the address. In Internet Protocol version 4 (IPv4) addressing, for example, the address prefix can be expressed as "9.2.0.2/16". The "/16" indicates that the first 16 bits are used to identify the unique network leaving the remaining bits in the address to identify the specific hosts within this network.

A path joining a plurality of ASes, e.g., links 105, may be referred to as an AS_PATH. The AS_PATH attribute indicates the list of ASes to be traversed to reach the address destination. For example, as illustrated in FIG. 1, the AS 130 may store an AS_PATH attribute of "110 120 140 150" where the address destination is the AS 150 (or a particular IP address within AS 150). In this example, the AS_PATH attribute indicates that the path to the address destination AS 150 from AS 130 sequentially passes through AS 110, AS 120 and AS 140, in that order.

Although it may be preferable that all devices 170 in the AS 110, AS 120, AS 130, AS 140 and AS 150 be configured according to BGP, in a real-world implementation, it may be unlikely that each device communicates using BGP. Thus, the disclosed embodiments are applicable to scenarios where all devices 170 in the network 100 are configured according to BGP, as well as scenarios where only a subset of the devices 170 is configured as such. Moreover, between any of the ASes, there may be a single communication path 105, e.g., between AS 110 and AS 130, as shown in FIG. 1, or there may be multiple communication paths 105, e.g., between AS 120 and AS 140. Thus, the disclosed embodiments are applicable to either case, as described in further detail below.

Moreover, a security extension to the BGP has been developed, referred to as BGPSEC, which provides improved security for BGP routing. BGP does not include mechanisms that allow an AS to verify the legitimacy and authenticity of BGP route advertisements. The Resource Public Key Infrastructure (RPKI) is a distributed database of certified Route Origin Authorizations (ROA) for originating AS validation to prevent route leaks and hijacks. BGPSEC extends the RPKI by adding an additional type of certificate, referred to as a BGPSEC router certificate, that binds an AS number to a public signature verification key, the corresponding private key of which is held by one or more BGP speakers within this AS. Private keys corresponding to public keys in such certificates can then be used within BGPSEC to enable BGP speakers to sign on behalf of their AS. The certificates thus allow a relaying party to verify that a BGPSEC signature was produced by a BGP speaker belonging to a given AS. Thus, a goal of BGPSEC is to use signatures to protect the AS_PATH attribute of BGP update messages so that a BGP speaker can assess the validity of the AS_PATH in update messages that it receives.

As noted above, each one of AS 110, 120, 130, 140, and/or 150 may be formed of a number of nodes (e.g., routers, switches, etc.) for routing network traffic using, for example, segment routing. The routers within a given AS may be configured according to interior gateway protocol (IGP).

IGP is an example protocol used for exchanging routing information between gateways (e.g., nodes such as routers within such an AS).

Figure 2:
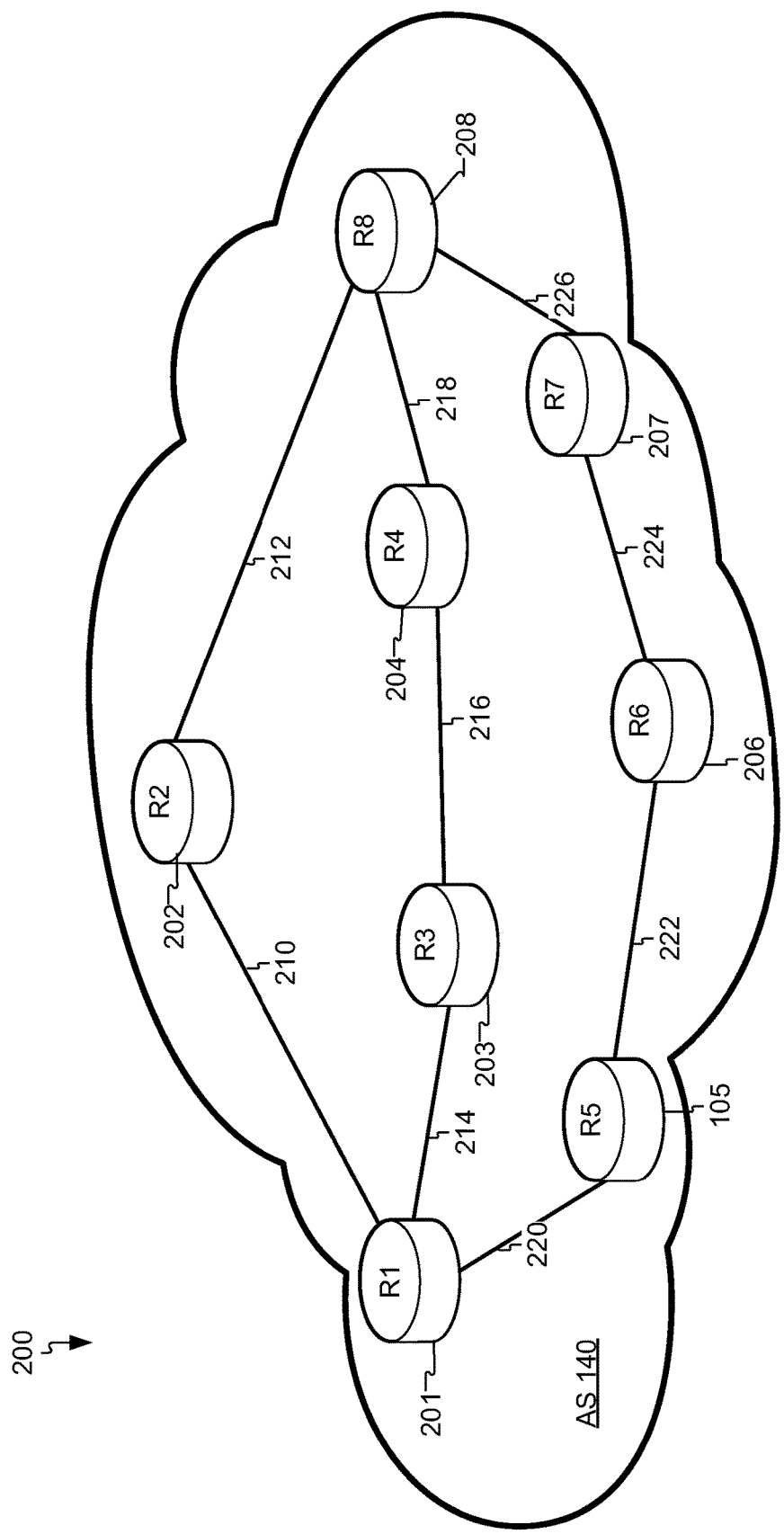
FIG. 2 illustrates an example network topology of an AS such as one or more ASes of FIG. 1, according to some aspects of the present disclosure.

FIG. 2 illustrates an example network topology of an AS such as one or more ASes of FIG. 1, according to some aspects of the present disclosure. For illustrative purposes only, the topology 200 shown in FIG. 2 is that of the AS 140 of FIG. 1. However, the topology 200 can be that of any one of ASes 110, 120, 130, 140, and/or 150. In the example topology 200, the network is formed of eight nodes (e.g. routers), namely, R1 201, R2 202, R3 203, R4 204, R5 205, R6 206, R7 207, and R8 208. Any one of nodes R1 201 to R8 208 can also function as a border gateway for traffic routing to other ASes, as described above with reference to FIG. 1.

The nodes R1 201 to R8 208 of the topology 200 may be configured to communicate with one another according to any known or to be developed communication protocol such as the IGP protocol. Furthermore, the nodes R1 201 to R8 208 may be connected to their neighboring nodes via dedicated links. For example, R1 201 is connected to R2 202 via the link 210, R2 202 is connected R8 208 via the link 212, R1 201 is connected to R3 203 via the link 214, R3 203 is connected to R4 204 via the link 216, R4 204 is connected to R8 208 via the link 218, R1 201 is connected to R5 205 via the link 220, R5 205 is connected to R6 206 via the link 222, R6 206 is connected to R7 207 via the link 224, and R7 207 is connected to R8 208 via the link 226. The links 210, 212, 214, 216, 218, 220, 222, 224, and/or 226 may be any suitable combination of wired links and shared media (e.g., wireless links, Internet Exchange Points, etc.).

Each of the nodes R1 201 to R8 208 may determine a shortest path from itself to any other node within AS 140 based on IGP metrics. A resulting shortest path tree that identifies the shortest path from each node to any other node within the AS 140 may be referred to as first shortest path tree, which will be referenced in the remote weighted SRLG process described below.

Figure 3:
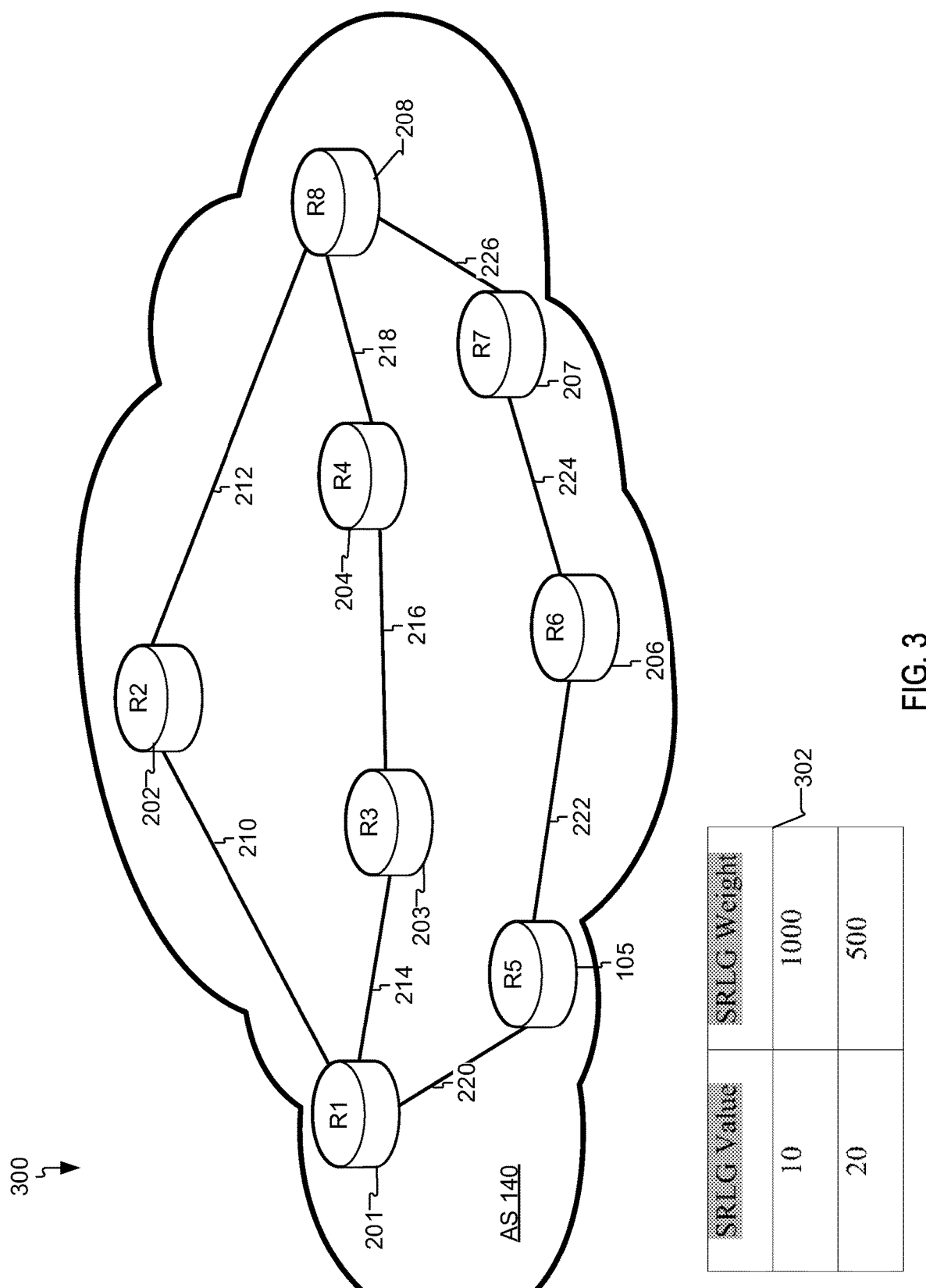
FIG. 3 illustrates the example network topology of FIG. 2 with example SRLG values and weights assigned thereto, according to some aspects of the present disclosure.

FIG. 3 illustrates the example network topology of FIG. 2 with example SRLG values and weights assigned thereto, according to some aspects of the present disclosure. The topology 300 is the same as the topology 200 with nodes and links as described above with reference to FIG. 2. However, FIG. 3 includes a table 302 where each link (e.g., the links 210, 212, 214, 216, 218, 220, 222, 224, and/or 226) has an SRLG value and a corresponding SRLG weight assigned thereto. For example, the links 210, 214, and 218 may have the same SRLG value 10, the links 220 and 224 may have the SRLG value 20, etc. In some examples, a single link may have more than one SRLG value assigned thereto.

When two or more links share the same SRLG value, then two such nodes have at least one common resource, which affects all such links in that group if the common resource fails. A non-limiting example of a common resource can be a common fiber. For example, the links 220 and 224 have the same SRLG value 10 in the example mentioned above because the links 220 and 224 share the same fiber. When a link has more than one SRLG value assigned thereto, then such link may share separate physical resources with two separate nodes. For example, the link 226 may have SRLG values 10 and 20 assigned thereto, which indicates that the link 226 shares at least one resource with the links 210 (assuming the link 210 has the SRLG value 10) and at least one resource with the link 220 (assuming the link 220 has the SRLG value 20).

It should be noted that the example table 302 identifies only two SRLG values and associated weights. However, the present disclosure is not limited to network topologies with only two SRLG values assigned to the links but may include more or less SRLG values. Furthermore, weights associated with different SRLG values may be the same or different. These example weights will be referenced below when described second and third shortest path trees determined for performing the remote weighted SRLG process.

In some examples, an SRLG may be represented by a 32-bit number unique within an IGP domain (e.g., Open Shortest Path First (OSPF) and Intermediate System-to-Intermediate System (ISIS)). As noted above, a link may belong to multiple SRLGs.

SRLG values described with reference to FIG. 3 are used for performing node and/or link protection (SRLG protection) where determining the shortest path from one node to another within a network. As noted above, current Loop Free Alternative (LFA) path selection implementations in IGPs support SRLG protection. The current SRLG protection though only takes into consideration SRLGs of the directly connected links (local links) for any given node or link being protected. This may be referred to "local SRLG protection," which may dictate that a protected interface and the backup path interface should not share any SRLG values. The shortcoming of this solution is that since only the local links are considered, if some links not connected to the network node that is determining the shortest path tree (determining node), share the same SRLG as the protected link on the determining node, the backup path may actually cross the link that shares the same SRLG as the protected link. In such case, the backup path may divert the traffic to a path over a link that failed as well, resulting in traffic being dropped during the protecting time. In summary, the protection would not be provided in such case.

For example, with reference to FIG. 3, the determining node is R1 201, the destination node is R8 208, and the link being protected is the link 210 with the SRLG value 10. The primary path between R1 201 and R8 208 is R1-R2-R8 using links 210 and 212. The local SRLG protection backup path in this case will be via the path R1-R3-R4-R8 via the links 214, 216, and 218. However, in this example, the link 216 may share the same SRLG value as the link 210. Therefore, when the traffic us switched to the backup path in case of link failure on the link 210, the traffic will cross a link (that includes the link 216) which shares the same SRLG value as the protected link 219. In this example, the link 216 is remote relative to the link 210. The current LFA implementations that perform local SRLG protection fail to capture the shared SRLG of the link 216 with the link 210 and thus using the backup path when the primary path is not available will result in packet drops. In this instance, the best SRLG disjoint path would be via R1-R5-R6-R7-R8 via the links 220, 222, 224, and 226, which can be captured using remote weighted SRLG solutions and techniques of the present disclosure.

Another shortcoming of currently available LFA path selection implementations is that they do not provide a way to specify which SRLGs are more important than the others. In instances where a backup path has to be selected from the multiple available backup paths all sharing some SRLG with the protected node/link, no specific selection is done. Referring back to the example above, when the determining node is R1 201 and the destination node is R8 208, there may be two available backup paths (one via the links 214, 216, and 218 and the other via the links 220, 222, 224, and 226) sharing a SRLG value with the primary path. For example, the protected link 210 may have SRLG values 10 and 20 and the link 214 on one back up path may share the SRLG value 10 with the protected link 210 while the link 220 on the other back up path may share the SRLG value 20 with the protected link 210. According to existing techniques, one of these backup paths may randomly be selected over the other. Moreover, customers may be more interested in selecting a backup path which does not share a particular SRLG value (e.g., SRLG value 10). Existing implementation also fail to provide this flexibility to customers. These among other deficiencies of existing systems and techniques, are addressed by the remote weighted SRLG techniques for path selection, described below.

For remote weighted SRLG protection, SRLG values across all backup paths rather than only local interfaces on a determining node are considered. Current IGP implementations (e.g., OSPF and IS-IS) already flood link SRLG values for all links in a network to all network nodes. Therefore, when determining the backup paths, remote weighted SRLG protection considers the SRLG value of all links in the area. This technique also includes associating a weight (some numerical number, selected from a range that may be determined based on experiments and/or empirical studies (e.g., 0-100, 0-1000, etc.)) with the SRLG values, non-limiting examples of which are shown in table 302 of FIG. 3. Weights of the SRLG values are taken into consideration when computing the backup path as well. For example, the higher a SRLG weight, the less preferred that path would be when determining backup paths. This gives the user a control over the importance of particular SRLG values in the context of backup path selection. The consequence of this approach is that the computed backup path may still use links that may share some of the SRLGs with the protected link if no backup path that excludes the SRLG values of the protected link/node can be found.

Figure 4:
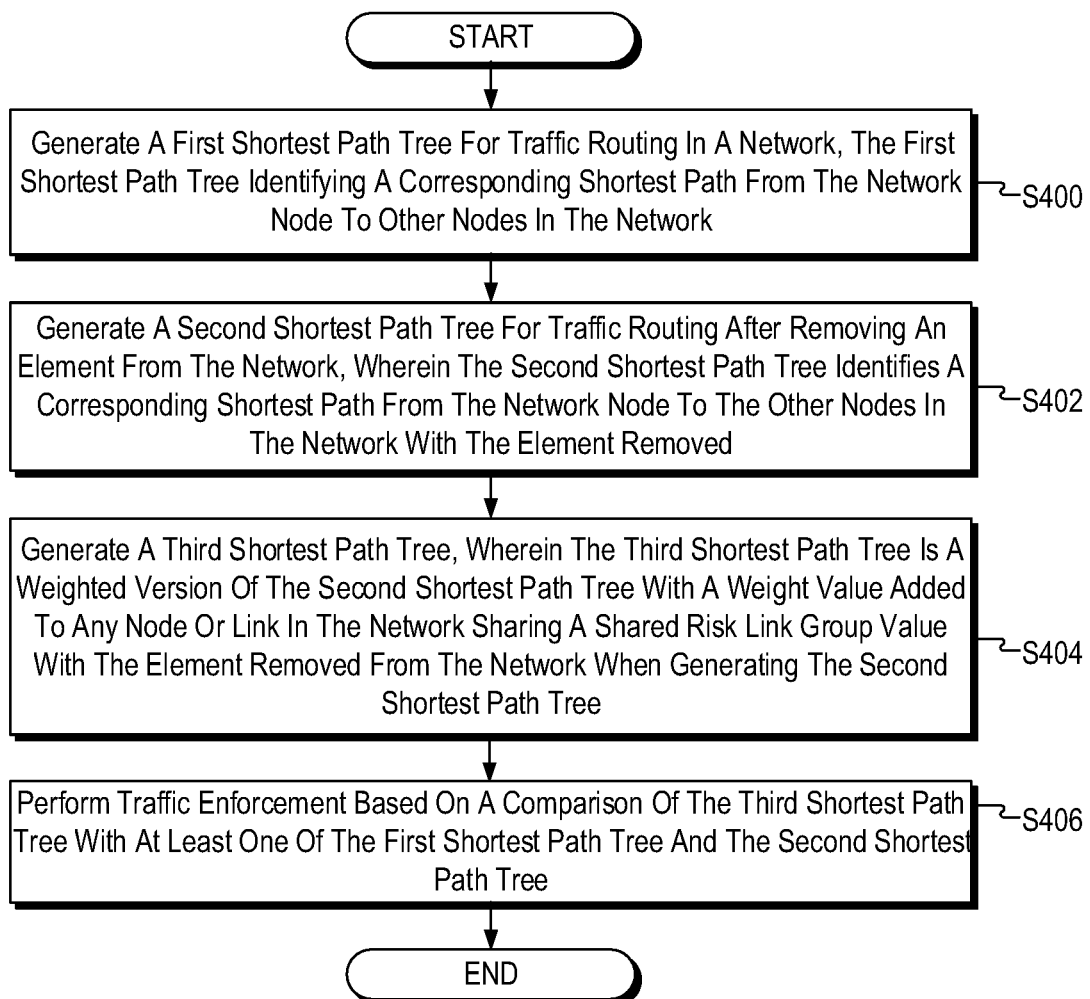
FIG. 4 illustrates an example method of remote weighted SRLG protection, according to some aspects of the present disclosure.

FIG. 4 illustrates an example method of remote weighted SRLG protection, according to some aspects of the present disclosure. Steps of FIG. 4 may be performed via a network controller associated with each AS such as a network controller associated with the AS 140 (not shown). Alternatively, the remote weighted SRLG techniques described with reference to FIG. 4 can be performed by any one or each of the nodes R1 201 to R8 208 of FIGS. 2 and 3 independently. In either case, such network controller and/or nodes of an AS may have one or more memories having computer-readable instructions stored thereon, which when executed by one or more associated memories, configure such network controller or node to perform the steps of FIG. 4.

For ease of discussion, FIG. 4 will be described with reference to FIGS. 2 and 3 and from the perspective of the node R1 201 with the link 210 between the node R1 201 and the node R2 202 being protected. However, it should be noted that the same process can be performed by the node R1 201 for protecting any given node in AS 140 and/or any given link in the AS 140 as shown in FIGS. 2 and 3. Similarly, the same process can be performed by any one of the other nodes of the AS 140 for protecting any node or link the AS 140. Moreover, the same process for protecting any node or link can be performed by a network controller associated with AS 140.

At S400, the node R1 201 determines (generates) a first shortest path tree for traffic routing among the nodes of the network (AS 140). In one example, the first shortest path tree can identify a corresponding shortest path from the node R1 201 to other nodes (e.g., R2 202 to R8 208) in the AS 140. In one example, the first shortest path tree may be generated according to known and normal IGP metrics. In one example, the first shortest path is generated without removing any node or link to be protected (e.g., the link 210).

At S402, the node R1 201 determines (generates) a second shortest path tree for traffic routing among the nodes of the AS 140. In one example, the second shortest path tree may be determined after removing an element from the network. The element may be any node or link to be protected (e.g., the link 210). Accordingly, the second shortest path tree from the node R1 is determined with the link 210 removed from the topology 200/300.

At S404, the node R1 201 determines (generates) a third shortest path tree. In one example, the third shortest path tree is a weighted version of the second shortest path tree with a weight value added to any node or link in the network having the same SRLG value as the element (e.g., the link 210) removed from the network when generating the second shortest path tree. In one instance and as described above with reference to FIG. 3, the link 210 that is being protected may have a SRLG value 10 associated with it. At the same time, the link 216 may also have the SRLG value 10 associated with it. According to the table 302, the SRLG weight for the SRLG value 10 is 1000. Accordingly, the link 216 will be penalized with a value 1010.

At S406, the node R1 201 performs traffic enforcement based on a comparison of the third shortest path tree determined at S404 with at least one of the first shortest path tree determined at S400 and/or the second shortest path tree determined at S402. The comparison process for traffic enforcement will be described next with reference to FIG. 5.

Figure 5:
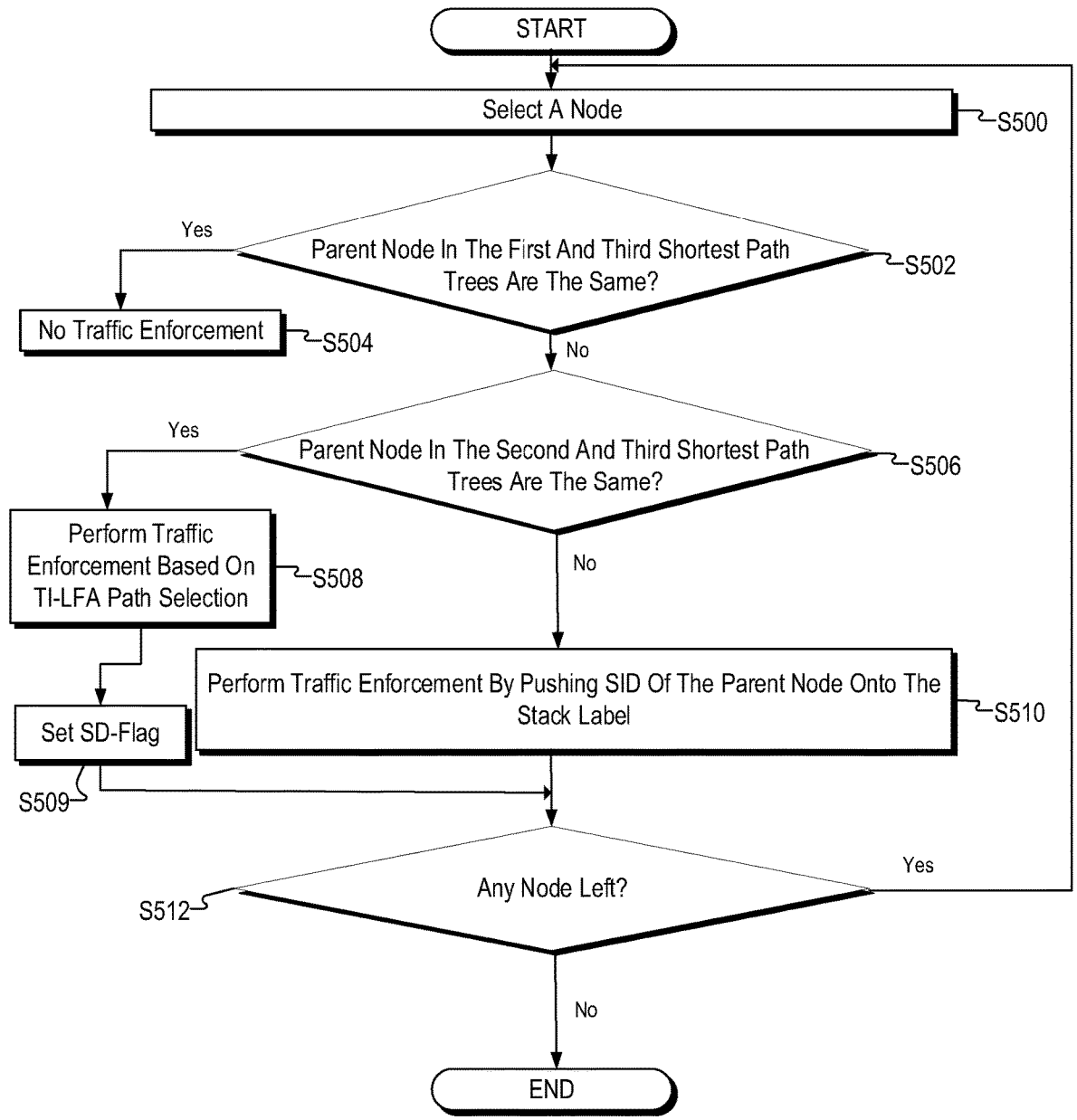
FIG. 5 illustrates an example method of traffic enforcement based on comparison of shortest path trees of FIG. 4, according to some aspects of the present disclosure.

FIG. 5 illustrates an example method of traffic enforcement based on comparison of shortest path trees of FIG. 4, according to some aspects of the present disclosure. FIG. 5 will be described from the perspective of the same component as the component performing the process of FIG. 4 (e.g., in this example, the node R1 201). In one example, the process of FIG. 5 is implemented when there is a shortest path to a node in the third shortest path tree. Such node may be referred to as a destination node on the shortest path.

At S500, the node R1 201 selects a node along the identified shortest path to the destination node in the third shortest path tree. For example, such node can be any one of the nodes R3 203, R4 304 and R8 208, when the node R1 201 is the node performing the steps of FIGS. 4 and 5 and the destination node is node R8 208 in FIG. 3. This node may be referred to as the selected node. In some examples, there may be more one node along the shortest path in the third shortest path tree identified for the destination node R8 208. Therefore, the process of FIG. 5 may be repeated for each such node.

At S502, the node R1 201 determines, for the selected node, whether a corresponding parent node is the same in the third shortest path tree and the first shortest path tree. If, for the selected node in the AS 140, the corresponding parent nodes are the same in the third and first shortest path trees, then at S504, the node R1 201 does not perform any additional traffic enforcement for weighted remote SRLG TI-LFA back up path.

For instance, at S502, the node R1 201 determines if a parent node of the selected node (e.g., node R3 203) in the third shortest path tree is the same as that in the first shortest path tree (i.e., whether the parent node of the node R3 203 is R1 201 in both the first and the third shortest path trees). In one example, the selected node R3 203 may have more than one parent node (e.g., a set of parent nodes) in each of the first and the third shortest path trees. Accordingly, the comparison process at S502 may be between the sets of parent nodes of the selected node. If the parent nodes (or alternatively the sets of parent nodes) are the same in the first and the third shortest path trees (Yes at S502), then no additional traffic enforcement is needed to reach the node R3 203 when link 210 is down/removed from the AS 140. Thereafter, the process may proceed to S512, which will be described below.

For instance, at S502, the node R1 201 may determine that the parent node of the node R3 203 in the first shortest path tree is R1 201 while the parent node of the node R3 203 in the third shortest path tree is the node R4 204 (No at S502). In this case, the process proceeds to S506.

At S506, the node R1 201 determines, for the selected node, whether a corresponding parent node (or a corresponding set of parent nodes, as described above) in the third shortest path tree is the same as a corresponding parent node in the second shortest path tree.

More specifically, at S506, the node R1 201 determines if a parent node of the selected node of the AS 140 that is selected at S500 is the same in both the second and the third shortest path trees. If the parents are the same in the second and third shortest path trees for a given remaining node (Yes at S506), then at S508, the node R1 201 performs the exact same traffic enforcement that was computed for the corresponding (link or node) protecting TI-LFA (regular TI-LFA path selection). Thereafter, the process proceeds to S512, which will be described below.

For instance, at S506, the node R1 201 determines if a parent of the node R3 203 in the third shortest path tree is the same as in the second shortest path tree (i.e., whether the parent node of the node R3 203 is R1 201 in both the second and the third shortest path trees). If the parents are the same in both the second and the third shortest path trees, then at S508, the node R1 201 performs traffic enforcement that was computed for the corresponding (link or node) protecting TI-LFA (regular TI-LFA path selection).

At S509, the node R1 201 sets a flag (e.g., a SD-flag) on the selected node (e.g., node R2 202). Specifically, at S509, the node R1 201 has determined that (a) the parent nodes (or the sets of the parent nodes) of the selected node (e.g., the node R3 203) on the first shortest path tree and third shortest path tree are not the same (No at S502) and that (b) the parent nodes (or the sets of parent nodes) in the second shortest path tree and third shortest path tree the same (Yes at S508), and (c) there is no traffic enforcement required based on the second shortest path tree. In one example, the set SD-flag may be inherited by children nodes of the selected node in the SRLG sub-tree until the SD-flag is reset. In one instance, when the SD-flag is set, only the comparison described at S506 is performed for such child node (i.e., the process at S502 is skipped). Thereafter, the process proceeds to S512, which will be described below.

Furthermore, the SD-flag is reset when (1) traffic enforcement is to be performed due to the node under consideration (e.g., a node with a SD-flag) having different parent nodes in the third and the second shortest path trees (NO at S506 as will be described below), or (2) when any other enforcement is needed (e.g. due to enforcing backup traffic on a link from a set of parallel links, etc.).

Referring back to S506, if at S506, the node R1 201 determines that the parent node of a destination node of the AS 140 is different (No at S506) in the third shortest path tree and in the second shortest path tree (e.g., parent node of the node R3 203 is the node R1 201 in the second shortest path tree while the parent node of the node R3 203 is the node R4 204 in the third shortest path tree), then at S510, the node R1201 performs traffic enforcement by pushing the Segment Identifier (SID) of the parent node of the selected node in the third shortest path tree (e.g., the node R4 204) onto the stack label to ensure that the selected node (e.g., the node R3 203) is selected and included in the backup path should the protected node/link (e.g., the link 210) fail.

At S512, the node R1 201 determines if there are any other selected nodes along the shortest path in the third shortest path tree for the destination node to be examined for traffic enforcement (e.g., any of the other nodes R4 204 or R8 208 along the example shortest path from node R1 201 to node R8 208 via nodes R3 203 and R4 204). If at S512, the node R1 201 determines there are one or more additional nodes to be examined, the process reverts back to S500 and the node R1 201 repeats S500 to S512, as described above, until all of the nodes are examined. Thereafter, the process ends.

The processes of FIGS. 4 and 5 may be performed by every node (e.g., every router) in a given network such as every node of the AS 140. Alternatively, the processes of FIGS. 4 and 5 may be performed by a network controller of an AS such as the AS 140.

Figure 6:
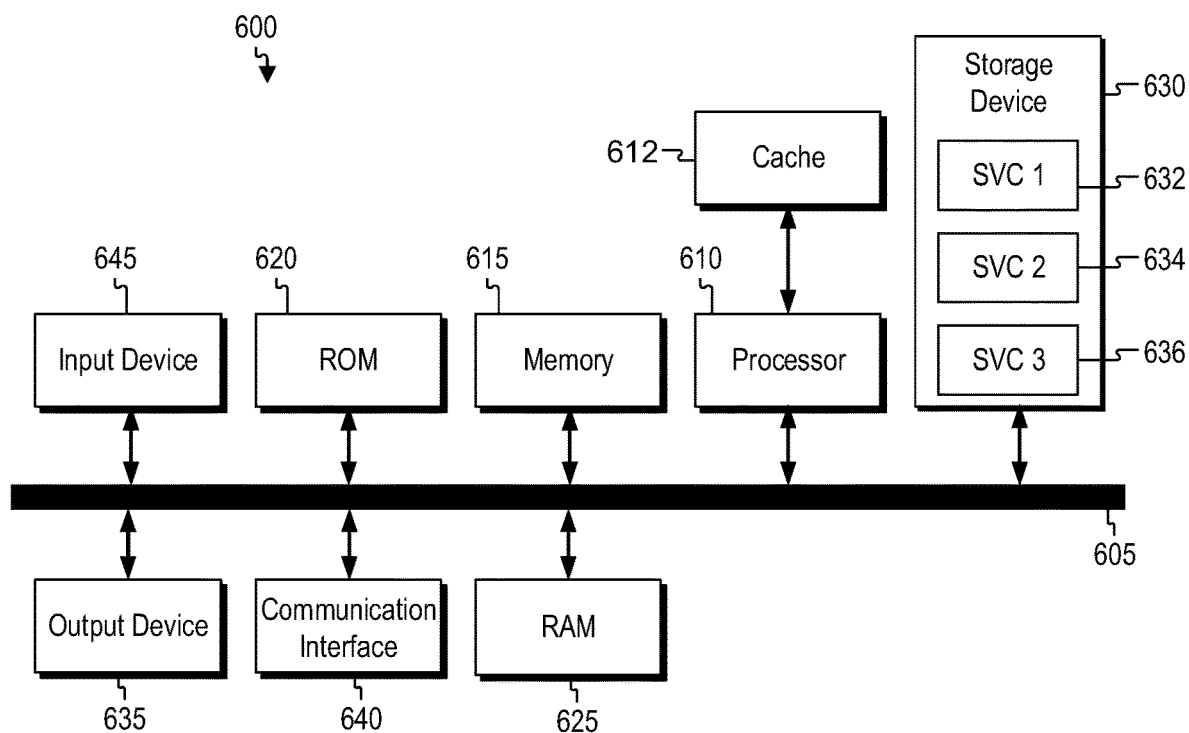
FIG. 6 illustrates an example of computing system, according to some aspects of the present disclosure.

FIG. 6 illustrates an example of computing system, according to some aspects of the present disclosure. FIG. 6 shows an example of computing system 600, which can be for example any computing device making up the components of the systems described with reference to FIGS. 1-3 including, but not limited to, nodes R1 201 to R2 208 of FIGS. 2 and 3, nodes 170 of FIG. 1, any network controller not shown, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments computing system 600 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service (SVC), such as SVC 1 632, SVC 2 634, and SVC 3 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances the present technology may be presented as including individual functional blocks including functional blocks comprising devices, device components, steps or routines in a method embodied in software, or combinations of hardware and software.

Claim language reciting "at least one of" refers to at least one of a set and indicates that one member of the set or multiple members of the set satisfy the claim. For example, claim language reciting "at least one of A and B" means A, B, or A and B.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
generating, at a network node, a first shortest path tree for traffic routing in a network, the first shortest path tree identifying a corresponding shortest path from the network node to other nodes in the network;
generating, at the network node, a second shortest path tree for traffic routing after removing an element from the network, wherein the second shortest path tree identifies a corresponding shortest path from the network node to the other nodes in the network with the element removed;
generating, at the network node, a third shortest path tree, wherein the third shortest path tree is a weighted version of the second shortest path tree; and
performing, at the network node, traffic enforcement based on commonality of a parent node, for a given node, in the first shortest path tree and the third shortest path tree.

2. The method of claim 1, wherein the traffic enforcement is performed when the parent node, for the given node, is not common in the first shortest path tree and the third shortest path tree.

3. The method of claim 1, wherein the element removed from the network is one of a node or a link connecting two nodes in the network.

4. The method of claim 1, wherein, in the third shortest path tree, a weight value is added to any node or link in the network sharing a shared risk link group value with the element removed from the network when generating the second shortest path tree.

5. The method of claim 1, wherein no traffic enforcement is performed on the given node if the parent node is common between the first shortest path tree and the third shortest path tree.

6. The method of claim 1, further comprising:
setting a flag on the given node if the parent node of the given node in the first shortest path tree and the parent node of the given node in the third shortest path tree are not the same, if all corresponding parent nodes of the given node in the second shortest path tree and the third shortest path tree are the same, and if traffic is not enforced based on the second shortest path tree.

7. The method of claim 1, wherein the traffic enforcement comprises:
determining, for the given node of the network, that the parent node in the third shortest path tree is the same as the parent node in the second shortest path tree; and
performing the traffic enforcement according to regular Topology-Independent Loop-Free Alternate (TI-LFA) path selection.

8. The method of claim 1, wherein the traffic enforcement comprises:
determining, for the given node of the network, that the parent node in the third shortest path tree is not the same as the parent node in the second shortest path tree; and performing the traffic enforcement by including a segment identifier of the parent node of the given node in the third shortest path tree, in a packet stack.

9. A network node comprising:
one or more memories having computer-readable instructions stored therein; and
one or more processors configured to execute the computer-readable instructions to:
generate a first shortest path tree for traffic routing in a network, the first shortest path tree identifying a corresponding shortest path from the network node to other nodes in the network;
generate a second shortest path tree for traffic routing after removing an element from the network, wherein the second shortest path tree identifies a corresponding shortest path from the network node to the other nodes in the network with the element removed;
generate a third shortest path tree, wherein the third shortest path tree is a weighted version of the second shortest path tree; and
perform traffic enforcement based on commonality of a parent node, for a given node, in the first shortest path tree and the third shortest path tree.

10. The network node of claim 9, wherein the traffic enforcement is performed if the parent node, for the given node, is not common in the first shortest path tree and the third shortest path tree.

11. The network node of claim 9, wherein the element removed from the network is one of a node or a link connecting two nodes in the network.

12. The network node of claim 9, wherein, in the third shortest path tree, a weight value is added to any node or link in the network sharing a shared risk link group value with the element removed from the network when generating the second shortest path tree.

13. The network node of claim 9, wherein no traffic enforcement is performed on the given node if the parent node is common between the first shortest path tree and the third shortest path tree.

14. The network node of claim 9, wherein the one or more processors are configured to execute the computer-readable instructions to set a flag on the given node if the parent node of the given node in the first shortest path tree and the parent node of the given node in the third shortest path tree are not the same, if all corresponding parent nodes of the given node in the second shortest path tree and the third shortest path tree are the same, and if traffic is not enforced based on the second shortest path tree.

15. The network node of claim 9, wherein the one or more processors are configured to execute the computer-readable instructions to:
determine, for the given node of the network, that the parent node in the third shortest path tree is the same as the parent node in the second shortest path tree; and
perform the traffic enforcement the traffic enforcement according to regular Topology-Independent Loop-Free Alternate (TI-LFA) path selection.

16. The network node of claim 9, wherein the one or more processors are configured to execute the computer-readable instructions to:
determine, for the given node of the network, that the parent node in the third shortest path tree is not the same as the parent node in the second shortest path tree; and perform the traffic enforcement by including a segment identifier of the parent node of the given node in the third shortest path tree, in a packet stack.

17. One or more non-transitory computer-readable media comprising computer-readable instructions, which when executed by one or more processors at a network node, cause the network node to:
generate a first shortest path tree for traffic routing in a network, the first shortest path tree identifying a corresponding shortest path from the network node to other nodes in the network;
generate a second shortest path tree for traffic routing after removing an element from the network, wherein the second shortest path tree identifies a corresponding shortest path from the network node to the other nodes in the network with the element removed;
generate a third shortest path tree, wherein the third shortest path tree is a weighted version of the second shortest path tree; and
perform traffic enforcement based on commonality of a parent node, for a given node, in the first shortest path tree and the third shortest path tree.

18. The one or more non-transitory computer-readable media of claim 17, wherein the traffic enforcement is performed if the parent node, for a given node, is not common in the first shortest path tree and the third shortest path tree.

19. The one or more non-transitory computer-readable media of claim 17, wherein the execution of the computer-readable instructions, cause the network to:
determine, for the given node of the network, that the parent node in the third shortest path tree is the same as the parent node in the second shortest path tree; and
perform the traffic enforcement the traffic enforcement according to regular Topology-Independent Loop-Free Alternate (TI-LFA) path selection.

20. The one or more non-transitory computer-readable media of claim 17, wherein the execution of the computer-readable instructions, cause the network to:
determine, for the given node of the network, that the parent node in the third shortest path tree is not the same as the parent node in the second shortest path tree; and perform the traffic enforcement by including a segment identifier of the parent node of the given node in the third shortest path tree, in a packet stack.

* * * * *